United States Patent
Djelassi-Tscheck et al.

(10) Patent No.: US 11,431,162 B2
(45) Date of Patent: Aug. 30, 2022

(54) SMART ELECTRONIC SWITCH

(71) Applicant: Infineon Technologies AG, Neubiberg (DE)

(72) Inventors: Christian Djelassi-Tscheck, Villach (AT); Bernhard Auer, Millstatt (AT); Thomas Blasius, Haar (DE); Robert Illing, Finkenstein (AT); David Jacquinod, La Fare les oliviers (FR); Michael Luschin, Krumpendorf (AT); Andre Mourrier, Manosque (FR); Mario Tripolt, Ferndorf (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/991,930

(22) Filed: Aug. 12, 2020

(65) Prior Publication Data

US 2021/0050718 A1 Feb. 18, 2021

(30) Foreign Application Priority Data

Aug. 13, 2019 (DE) .......................... 102019121794.6

(51) Int. Cl.
*H02H 3/10* (2006.01)
*H02H 9/02* (2006.01)
(Continued)

(52) U.S. Cl.
CPC ............ *H02H 3/10* (2013.01); *H02H 1/0007* (2013.01); *H02H 5/047* (2013.01); *H02H 9/02* (2013.01)

(58) Field of Classification Search
CPC ............ H02H 3/243; H02H 3/08–105; H02H 3/24–247
See application file for complete search history.

(56) References Cited

U.S. PATENT DOCUMENTS 6,144,085 A   11/2000   Barker
7,279,765 B2  10/2007   Ahn et al.
(Continued)

FOREIGN PATENT DOCUMENTS

DE   102004063946 A1   3/2006
DE   102016100498 A1   7/2016
(Continued)

OTHER PUBLICATIONS

Oppenheim et al., Chapter 6, Section 6.3 Basic Structures for IIR Systems, Discrete-Time Signal Processing, 2nd Edition, 1999, pp. 359-361. (Applicant points out, in accordance with MPEP 609.94(a), that the year of publication, 1999, is sufficiently earlier than the effective U.S. filing date, so that the particular month of publication is not in issue.).

(Continued)

*Primary Examiner* — Jared Fureman
*Assistant Examiner* — Christopher J Clark
(74) *Attorney, Agent, or Firm* — Shumaker & Sieffert, P.A.

(57) ABSTRACT

An integrated circuit that may be employed as a smart switch is described herein. In accordance with one embodiment the integrated circuit includes a power transistor coupled between a supply pin and an output pin and further includes a control circuit configured to trigger a switch-on and a switch-off of the power transistor in accordance with an input signal. The control circuit is configured to trigger a switch-off of the power transistor when a load current passing through the power transistor is at or above a predetermined current and a supply voltage received at the supply pin is at or below a predetermined threshold voltage.

19 Claims, 6 Drawing Sheets

(51) Int. Cl.
*H02H 5/04* (2006.01)
*H02H 1/00* (2006.01)

(56) References Cited

U.S. PATENT DOCUMENTS

| | | |
|---|---|---|
| 7,489,855 B2 | 2/2009 | Kraus |
| 9,413,352 B2 | 8/2016 | Lim |
| 9,672,201 B1 | 6/2017 | Uszkoreit et al. |
| 9,887,532 B2 | 2/2018 | Djelassi et al. |
| 10,305,363 B1 | 5/2019 | Chen et al. |
| 2002/0024376 A1 | 2/2002 | Sander |
| 2005/0184715 A1 | 8/2005 | Kidokoro et al. |
| 2005/0270869 A1 | 12/2005 | Krischke et al. |
| 2007/0008744 A1 | 1/2007 | Heo et al. |
| 2012/0194119 A1 | 8/2012 | Kroeze et al. |
| 2013/0301175 A1 | 11/2013 | Posat |
| 2014/0078629 A1* | 3/2014 | Cortigiani ............... H02H 9/02 361/79 |
| 2014/0091384 A1 | 4/2014 | Petruzzi et al. |
| 2017/0063077 A1 | 3/2017 | Donath et al. |
| 2017/0294772 A1 | 10/2017 | Illing et al. |
| 2017/0294918 A1 | 10/2017 | Illing et al. |
| 2017/0294922 A1 | 10/2017 | Illing et al. |
| 2017/0366116 A1 | 12/2017 | Ogawa et al. |
| 2018/0287365 A1* | 10/2018 | Djelassi-Tscheck ..... H02H 3/10 |
| 2020/0021207 A1 | 1/2020 | Donat et al. |

FOREIGN PATENT DOCUMENTS

| | | |
|---|---|---|
| DE | 102015144460 A1 | 3/2017 |
| DE | 102017107520 A1 | 11/2017 |
| DE | 102017107523 A1 | 11/2017 |
| DE | 102017106896 A1 | 10/2018 |
| WO | 01/69784 A1 | 9/2001 |

OTHER PUBLICATIONS

Infineon Technologies AG, "BTN8962TA High Current PN Half Bridge NovalithIC™," Data Sheet, Rev 1.0, May 17, 2013, 26 pp.
International Standard ISO 7637-2, Third Edition, Mar. 1, 2011, entitled "Road vehicles-Electrical disturbances from conduction and coupling—Part 2: Electrical transient conduction along supply lines only," 48 pp.
International Standard ISO 26262-1, Second Edition, Dec. 2018, entitled "Road vehicles-Functional safety—Part 1: Vocabulary," 42 pp.
Office Action, in the German language, from counterpart German Application No. DE 10 2019 121 794.6, dated May 9, 2020, 7 pp.

* cited by examiner

SMART ELECTRONIC SWITCH

This application claims priority to German Patent Application Number 102019121794.6, filed Aug. 13, 2019, the entire content of which is incorporated herein by reference.

TECHNICAL FIELD

The present disclosure relates to the field of smart semiconductor switches.

BACKGROUND

In many applications, electrical loads are switched on and off using semiconductor switches. Semiconductor switches that include supplemental circuitry in addition to the electronic switch as such (e.g. a power transistor) are usually referred to as smart electronic switches or simply smart switches. Examples for supplemental circuitry are a temperature sensor for detecting excess temperature, a load current sensor measuring the load current passing through the switch, a control logic that generates a control signal triggering a switch-on or switch-off dependent on an input signal and measured parameters such as the measured current and temperature, and interface circuit for outputting measured parameters, etc.

Not only in automotive applications smart switches are increasingly used to replace conventional fuses. Smart switches, which can be used as a substitute for fuses may referred to as smart fuses or electronic fuses. In these cases, the smart switch may include circuitry which is configured to monitor the measured load current and to trigger a switch-dependent on the load current and a characteristic curve that represents a wire characteristic of a wire connecting the smart switch and an electric load. The wire characteristics allows the control circuit to trigger a disconnection of the load from the supply when an estimated wire temperature (relative to ambient temperature) exceeds a specified limit. Additionally, the above-mentioned supplemental circuitry included in a smart switch may provide a load current limitation function.

When two or more loads are connected to the power supply (e.g. the on-board supply of an automobile) a defective load that draws a relatively high current from the supply (die to the defect) may cause a drop of the supply voltage, which may also affect other loads connected to the same power supply.

SUMMARY

An integrated circuit that may be employed as a smart switch is described herein. In accordance with one embodiment the integrated circuit includes a power transistor coupled between a supply pin and an output pin and further includes a control circuit configured to trigger a switch-on and a switch-off of the power transistor in accordance with an input signal. The control circuit is configured to trigger a switch-off of the power transistor when a load current passing through the power transistor is at or above a predetermined current and a supply voltage received at the supply pin is at or below a predetermined threshold voltage.

Furthermore, a method for switching a load is described herein. In accordance with one embodiment the method includes enabling and disabling a load current path between a supply pin and an output pin using a power transistor in accordance with an input signal. The method further includes triggering a switch-off of the power transistor when a load current is at or above a predetermined current and a supply voltage received at the supply pin is below a predetermined threshold voltage.

BRIEF DESCRIPTION OF THE DRAWINGS

The invention can be better understood with reference to the following drawings and descriptions. The components in the figures are not necessarily to scale; instead emphasis is placed upon illustrating the principles of the invention. Moreover, in the figures, like reference numerals designate corresponding parts. In the drawings.

DETAILED DESCRIPTION

Figure 1:
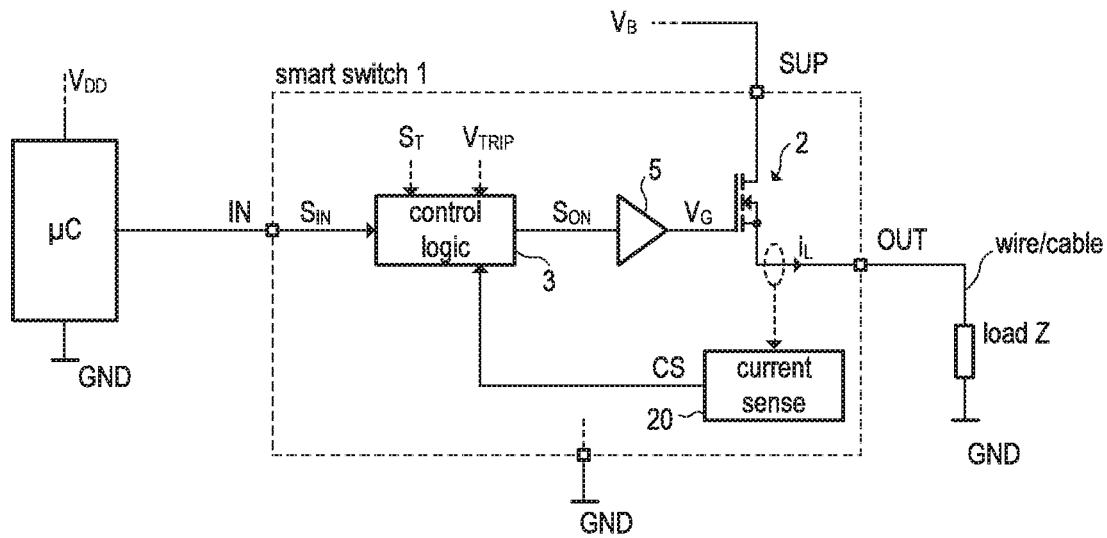
FIG. 1 illustrates a general example of a smart switch.

In the following detailed description, reference is made to the accompanying drawings. The drawings form a part of the description and, for the purpose of illustration, show examples of how the invention may be used and implemented. FIG. 1 illustrates one general example of an integrated smart switch circuit referred to as smart switch 1 in the following. The smart switch 1 may be integrated in a single semiconductor die arranged in a chip package. However, in some embodiments the smart switch 1 may include two or more semiconductor dies arranged in one chip package.

According to FIG. 1 the smart switch 1 includes an electronic switch 2, which may be a power transistor, e.g. a MOS transistor. DMOS transistors may be used as power transistors. Although the examples discussed herein use MOS transistors as power transistor 2 it is understood that a bipolar transistor may be used instead. A skilled person will have no problems to apply the concepts described herein to bipolar transistors. The power transistor 2 is coupled between a supply pin SUP and an output pin OUT of the smart switch 1. Accordingly, the power transistor 2 can connect the output pin OUT to the supply pin SUP when switched on. Similarly, the power transistor 2 can disconnect the output pin OUT from the supply pin SUP when switched off. In other words, the power transistor 2 can enables and disable a load current path between the supply pin SUP and the output pin OUT in accordance with the gate signal $V_G$ applied to the transistor's gate electrode. It is understood that, if a bipolar transistor is used as power transistor, the transistor is switched on and off in accordance with a base current instead of a gate voltage.

In the example of FIG. 1, the gate signal $V_G$ is provided by a gate driver circuit 5, which is configured to output the gate signal $V_G$ in accordance with a control signal $S_{ON}$, which is a binary signal that may only assume a high level (e.g. indicating a switch-on) and a low level (e.g. indicating a switch-off). The control signal $S_{ON}$ is provided by a logic circuit, also referred to as control logic 3. The control logic 3 may include combinational and sequential logic circuits as well as synchronous and asynchronous circuits. The control logic 3 is configured to trigger a switch-on and a switch-off of the transistor 2 (by generating the control signal $S_{ON}$ with the appropriate logic level) based on the input signal $S_{IN}$, which is received at an input pin IN of the smart switch, and other parameters. The input signal $S_{IN}$ may be generated by an external (separate from the smart switch 1) circuit such as, for example, a microcontroller which is labelled µC in the example of FIG. 1.

It is noted that the input signal $S_{IN}$ is not necessarily received at an input pin of the smart switch. In some embodiments the smart switch may have a digital communication interface, such as, for example, a Serial Peripheral Interface (SPI) or the like that allows to receive data (e.g. from a microcontroller) including switch-on and switch-off commands. In these embodiments, the smart switch may include circuitry that generates the input signal $S_{IN}$ and sets the logic level of the input signal $S_{IN}$ in accordance with the switch-on and switch-off commands received via the digital communication interface.

The above-mentioned other parameters, which may be processed by the control logic 3 when generating the control signal $S_{ON}$ with a specific logic level, may be for example, a measured value representing the chip temperature, a measured value representing the load current, configurable threshold values (e.g. an over-temperature threshold), etc. The load current $i_L$ that is output at the output pin OUT to a load Z may be measured by a current sense circuit 20. The current sense circuit 20 may, for example, include a sense transistor coupled to power transistor 2 and operated in the same operating point. Current sensing using sense transistors is well known to a skilled person and thus not discussed in detail herein. For example, the power transistor may be composed of a plurality of transistor cells of a cell array, wherein one or a few transistor cells of the cell array may be used to form a sense transistor. In a simple embodiment, the current sense circuit may include a current sense resistor connected between a load terminal (e.g. the source terminal) of the transistor 2 and the output pint OUT. In this case the voltage drop across the current sense resistor is indicative of the load current and may be used as current sense signal. A further example of the above-mentioned parameters is a current threshold which may be used to implement an over-current shut-down function. For example, when the current sense signal CS provided by the current sense circuit 20 reaches or exceeds a critical current value represented by threshold value $V_{TRIP}$, then the control logic 3 triggers a switch-off of the transistor 2 until a switch-on is again triggered by the input signal $S_{IN}$.

In the example of FIG. 1, the smart switch 1 is configured as a high-side switch, i.e. the smart switch 1 is connected between a supply line providing the supply voltage $V_B$ (at supply pin SUP) and the load Z, which is connected to tout output pin OUT. The smart switch 2 has also a ground pin GND to receive a reference potential $V_{GND}$, which may be defined as 0 volts and serve as constant reference potential for the circuitry included in the smart switch 1.

Figure 2:
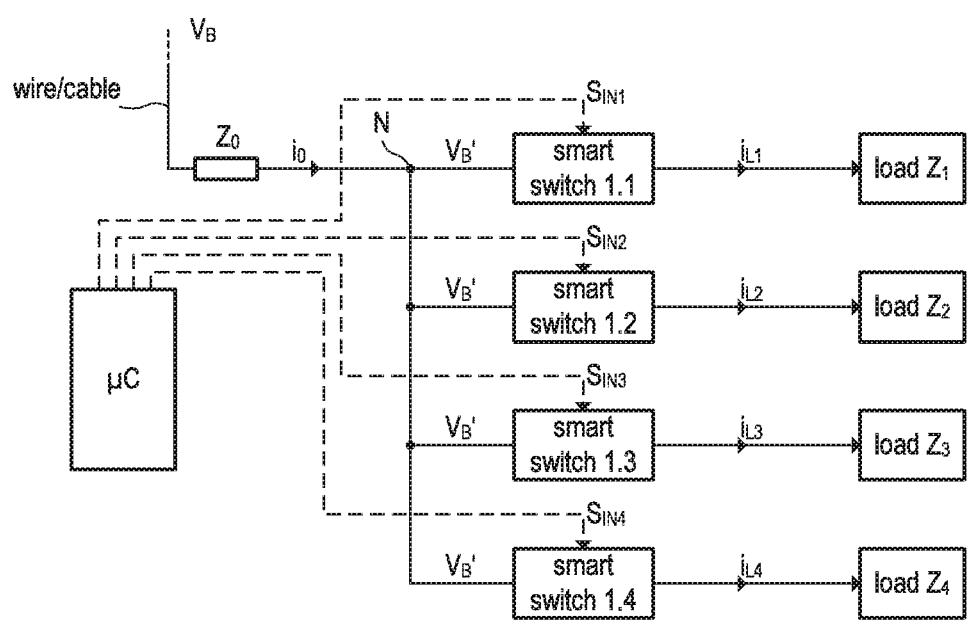
FIG. 2 illustrates the operation of a plurality of loads at the same power supply, wherein each load can be individually switched on and off via a respective smart switch.

FIG. 2 illustrates one example of a system including a plurality (two or more) of electrical loads $Z_1$, $Z_2$, $Z_3$, and $Z_4$, wherein each electrical load $Z_1$, $Z_2$, $Z_3$, and $Z_4$ is connected with the power supply (supply voltage $V_B$) via a respective smart switch 1.1, 1.2, 1.3 and, respectively, 1.4. In practice, the supply pins SUP of the plurality of smart switches 1.1, 1.2, 1.3, and 1.4 will be connected to a circuit node N, which is connected to the voltage source (e.g. an automotive battery) via a comparably long wire or cable. In particular, the cable between the voltage source (not shown in the figures) that generates the supply voltage $V_B$ and the circuit node N will be considerably longer (and have thus a correspondingly high impedance $Z_0$) than the short wirings between the circuit node N and the individual smart switches 1.1, 1.2, 1.3, and 1.4. It is understood that, in FIG. 2, the impedance $Z_0$ does not represent a specific resistor device but rather the intrinsic resistance of the cable/wire between the voltage source (e.g. battery) and the circuit node N. The input signals $S_{IN1}$, $S_{IN2}$, $S_{IN3}$, and $S_{IN4}$, for the smart switches may be provided by a microcontroller µC as in the previous example of FIG. 1. The microcontroller µC and the smart switches 1.1, 1.2, 1.3, and 1.4 may be arranged on the same circuit board which is, however, not necessarily the case.

The load currents passing through the smart switches 1.1, 1.2, 1.3, and 1.4 and the respective loads $Z_1$, $Z_2$, $Z_3$, and $Z_4$, are denoted as $i_{L1}$, $i_{L2}$, $i_{L3}$, and $i_{L4}$. Consequently, the total current $i_0$ passing through the cable between the voltage source, which generates the supply voltage $V_B$, and the circuit node N, equals the sum of the individual load currents $i_{L1}$, $i_{L2}$, $i_{L3}$, and $i_{L4}$ ($i_0=i_{L1}+i_{L2}+i_{L3}+i_{L4}$). As a result, the supply voltage "arriving" at circuit node N is somewhat lower the voltage $V_B$ due to the voltage drop $i_0 \cdot Z_0$ across the cable impedance $Z_0$ and denoted $V_B'$. That is, $V_B'=V_B-i_0 \cdot Z_0=Z_0 \cdot (i_{L1}+i_{L2}+i_{L3}+i_{L4})$. The voltage drop across the short wirings between the circuit node N and the smart switches 1.1, 1.2, 1.3, and 1.4 is negligible for the present discussion as the corresponding resistances are small as compared to the impedance $Z_0$.

In practice, situations may occur, in which a load draws—for whatever reason—a comparable high load current. An elevated load current, e.g. load current $i_{L1}$ passing through smart switch 1.1, will result in an elevated total current $i_0$ passing through the wire/cable connecting the voltage source and circuit node N. An elevated total current $i_0$ entails an elevated voltage drop $i_0 \cdot R_0$ across the cable and a correspondingly reduced voltage $V_B'$ at the circuit node N. In other words, the supply voltage "seen" by the loads $Z_1$, $Z_2$, $Z_3$, and $Z_4$, is the voltage $V_B'$ which will dip if one of the loads $Z_1$, $Z_2$, $Z_3$, and $Z_4$ draws an elevated load current.

As discussed above, a single load, e.g. load $Z_1$, which excessively draws current (load current $i_{L1}$ in the present example), for example due to a defect, may cause a voltage dip in the supply voltage $V_B'$, which is also "seen" by all other loads $Z_2$, $Z_3$, and $Z_4$. Such a dip in the supply voltage $V_B'$ may cause undesired effects and malfunctions in these loads $Z_2$, $Z_3$, and $Z_4$ although they are not defective. In a worst case scenario, a defect in one load (load $Z_1$ in the present example) may cause malfunction in all other loads (loads $Z_2$, $Z_3$, and $Z_4$ in the present example) that are supplied via the same circuit node N. To detect such a situation, the microcontroller µC would have to monitor the voltage $V_B'$ at circuit node N (e.g. using an analog-to-digital converter that may be included in the microcontroller) as well as the load currents $i_{L1}$, $i_{L2}$, $i_{L3}$, and $i_{L4}$, and trigger a switch off when a (by generating an appropriate input signal) of the smart switch connected to the defective load. Monitoring the load current may be done by the microcontroller µC, for example, by reading out the measured current information from the smart switches 1.1, 1.2, 1.3 and 1.4, e.g., via a digital communication interface (e.g. an Serial Peripheral Interface) or an analog diagnosis output pin (not shown in the figures). Smart switches with diagnosis output pin for outputting measured current information is as such known (and implemented, e.g., in smart switch BTS50010-1TAD of Infineon) and thus not further discussed herein. It is evident that the mentioned monitoring functions would render the circuit shown in FIG. 2 significantly more complex.

Figure 3:
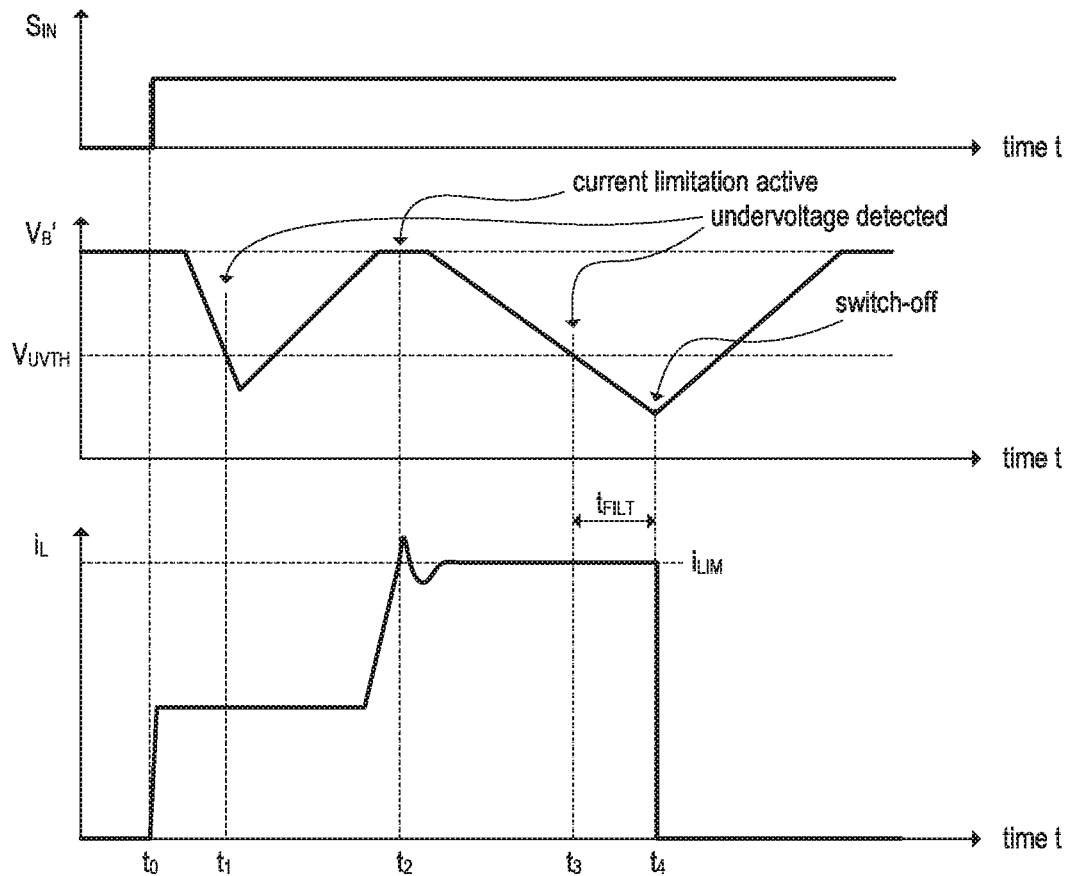
FIG. 3 includes timing diagrams illustrating the desired behavior of a smart switch according to the embodiments described herein.
Figure 4:
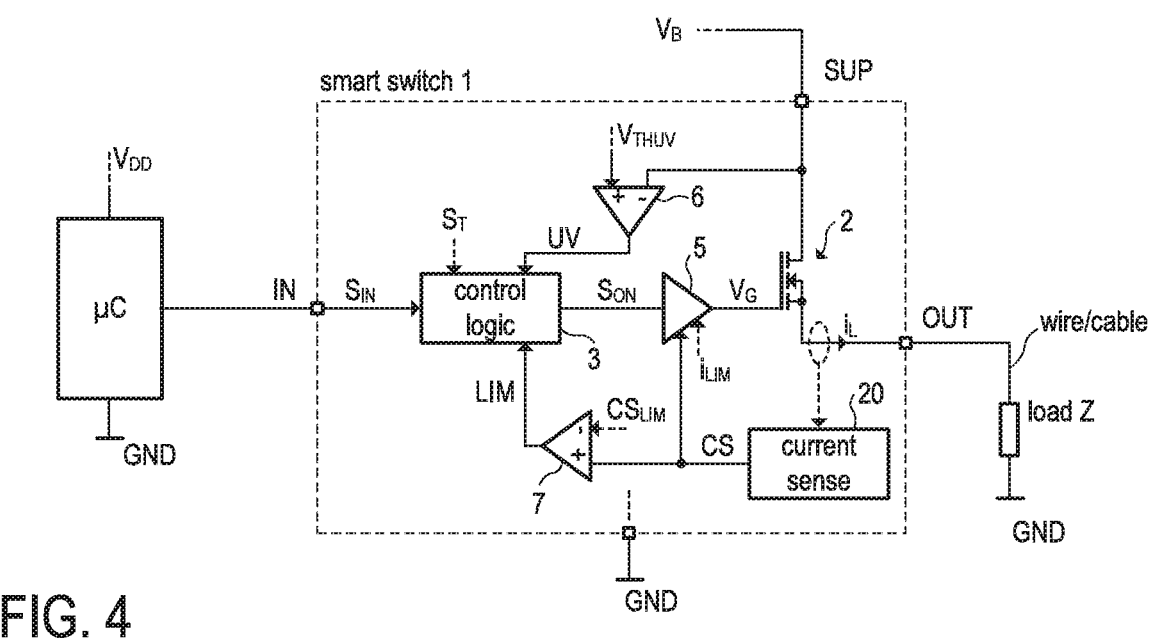
FIG. 4 illustrates one embodiment of a smart switch that can be operated as illustrated in FIG. 3.

The example discussed below with reference to FIGS. 3 and 4 may improve the situation and avoids the need of implementing the above-mentioned monitoring functions in the microcontroller. FIG. 3 includes timing diagrams illustrating the input signal $S_{IN}$ applied at the input pin IN of smart switch 1 (which may represent smart switch 1.1 of FIG. 2), the supply voltage $V_B'$ "seen" by the smart switch 1 (and other smart switches) and the load current $i_L$ passing through the smart switch 1. FIG. 4 illustrates one embodiment of a smart switch that is capable of detecting a dip in the supply voltage $V_B'$ and trigger a switch-off of the power transistor 2 when, at the same time, an excessively high load current passes through the power transistor 2. Basically, the timing diagrams of FIG. 3 illustrate the behavior/function of the smart switch illustrated in FIG. 4.

According to FIG. 3, the smart switch 1 of FIG. 4 receives an input Signal $S_{IN}$ that changes from a low level to a high level at time instant to $t_0$ trigger a switch-on of the smart switch. In response to detecting the high level of the input signal $S_{IN}$ the control logic 3 will generate a control signal $S_{ON}$ with a high level that causes the gate driver 5 to generate a gate voltage $V_G$ sufficiently high to switch-on the transistor 2. Almost immediately the load current $i_L$ starts to rise. Somewhat later, the voltage $V_B$ starts to drop (for whatever reason, e.g. due to a defect in a load connected to a neighboring smart switch) and, at time instant $t_1$, the voltage $V_B'$ falls below an undervoltage threshold $V_{UVTH}$. As, at the same time $t_1$, the load current $i_L$ is sufficiently low (i.e. under a current threshold $i_{LIM}$), the voltage $V_B'$ being under the undervoltage threshold $V_{UVTH}$ has no specific consequences as far as the operation of the smart switch 1 is concerned.

Again somewhat later the load current $i_L$ starts to rise (e.g. due to a defect in the load connected to the smart switch 1) and, at time instant $t_2$, the load current $i_L$ reaches the mentioned current threshold $i_{LIM}$ which causes the current limitation, which may be included in the gate driver 5, to become active. Accordingly, the gate driver 5 limits the load current $i_L$ to a maximum current defined by the mentioned threshold $i_{LIM}$. Then the voltage $V_B'$ starts to drop again until it falls below the undervoltage threshold $V_{UVTH}$ at time instant $t_3$. At time instant $t_3$ both conditions are fulfilled, namely, the load current having reached the current threshold $i_{LIM}$ (which means that the current limitation is active in the present example) and the voltage $V_B'$ has fallen to or below the undervoltage threshold $V_{UVTH}$. These both conditions (i.e. $i_L \geq i_{LIM}$ and $V_B' \leq V_{UVTH}$) being fulfilled is a strong indication that the high current drawn by the load connected to the smart switch 1 is responsible for the voltage dip and, in order to avoid negative effects to neighboring smart switches, the control logic 3 triggers a switch-off of the transistor 2 (by generating the control signal $S_{ON}$ with an appropriate logic level) upon detecting that both of the mentioned conditions are fulfilled. In the example of FIG. 4, the first condition ($i_L \geq i_{LIM}$) is detected by comparator 7 and the second condition ($V_B' \leq V_{UVTH}$) is detected by the comparator 6. The output signal of comparator 6 is denoted as UV and the output signal of comparator 7 is denoted as LIM. The signal UV having a high level may indicate that the voltage $V_B'$ has fallen to or below the threshold $V_{UVTH}$, and the signal LIM having a high level may indicate that the current sense signal CS has reached or exceeded the threshold $CS_{LIM}$, wherein $CS \geq CS_{LIM}$ is equivalent to $i_L \geq i_{LIM}$ as the threshold $CS_{LIM}$ is representative of the corresponding current limit $i_{LIM}$.

In order avoid a switch-off of the transistor 2 due to a short glitch in the voltage $V_B'$ the switch-off of transistor 2 is triggered not immediately at time instant $t_3$ but somewhat later at time instant $t_4 = t_3 + t_{FILT}$. In other words, the transistor 2 is only switched off when the critical situation (i.e. $i_L \geq i_{LIM}$ and $V_B' \leq V_{UVTH}$) lasts for a predetermined time period $t_{FILT}$ (filter time), and short voltage dips (shorter than $t_{FILT}$) are filtered/blanked. A filter that implements such a function may be included in the control logic 3. An example is described below with reference to FIGS. 5A and 5B.

Figure 5A:
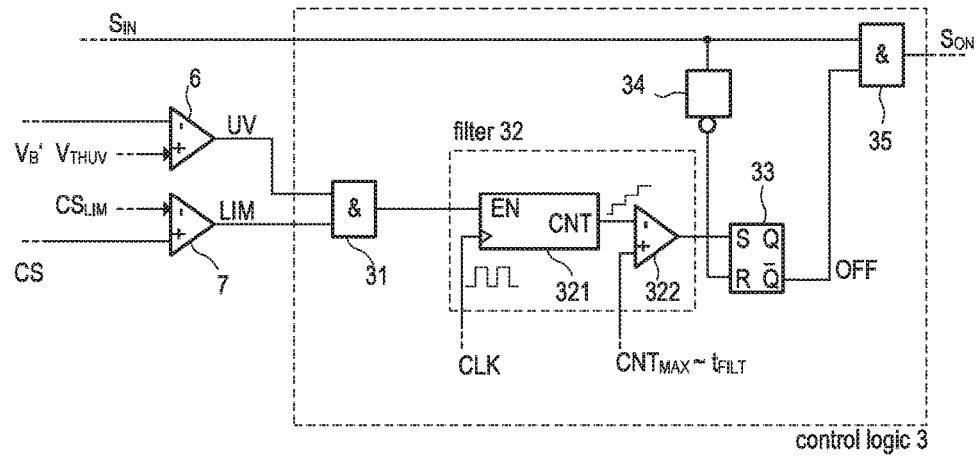
FIGS. 5A and 5B illustrate one exemplary implementation of a control logic included in the smart switch of FIG. 4.
Figure 5B:
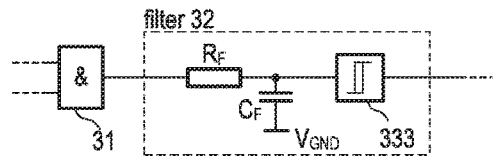

FIGS. 5A and 5B illustrate one exemplary implementation of the control logic 3 which may be used in the smart switch of FIG. 4. It is understood that only those parts and components of the control logic 3 that are relevant for the following explanations are depicted in FIGS. 5A and 5B. Other parts and components, which are not shown, may be implemented in the same way as it is done in existing smart switches such as, for example, the smart switch BTS50010-1TAD mentioned above.

In accordance with FIG. 5A, the control logic 3 receives the output signals of comparators 6 and 7, i.e. the signals UV and LIM, respectively. The purpose and the function of comparators 6 and 7 have already been discussed above and reference is made to FIG. 3 and the respective explanations. In the embodiment of FIG. 5A, the control logic 3 includes an AND-gate 31 that receives the signals UV and LIM. The output signal of AND-gate 31 will only assume a high level if (and only if) the signals UV and LIM indicate a supply voltage $V_B'$ below the threshold $V_{UVTH}$ and, respectively, a load current $i_L$ at or above the current threshold value $i_{LIM}$. The output of the AND-gate 31 is supplied to filter 32, which is configured to blank short pulses (shorter than a filter time $t_{FILT}$) at the output of AND-gate 31. When the output signal (logic conjunction UV & LIM) of the AND-gate 31 changes from a low level to a high level and the high level is maintained for at least the filter time $t_{FILT}$, then the output of the filter 32 follows the output of the AND gate 31 and also changes from a low level to a high level.

The output signal of the filter 32 changing to a high level indicates that both conditions (i.e. $i_L \geq i_{LIM}$ and $V_B'$ $V_{UVTH}$) have been simultaneously fulfilled for at least a time span that equals the filter time $t_{FILT}$. The output of filter 32 is connected to the set-input of SR-latch 33 (also referred to as SR flip-flop) and, thus, the SR-latch 33 is set when the output signal of filter 32 changes to a high level. The inverted output $\overline{Q}$ of the SR-latch 33, which provides the signal OFF, changes to a low level (i.e. $\overline{Q}=0$) when the SR-latch 33 is set. The signal OFF being at a low level indicates that the power transistor 2 is to be switched off irrespective of the logic level of the input signal $S_{IN}$. The control signal $S_{ON}$, which is supplied to the gate driver 5 (see FIG. 3), is generated by AND-gate 35 that receives, at its inputs, the input signal $S_{IN}$ and the signal OFF. Basically, the AND-gate 35 is transparent for the input signal $S_{IN}$ when the SR-latch is in a reset state (i.e. $\overline{Q}=1$), but it blanks the input signal $S_{IN}$ when the SR-latch is in a set state (i.e. $\overline{Q}=0$). The SR-latch 33 will be not reset until the input signal $S_{IN}$ returns to a low level (which must be triggered by an external circuitry such as the microcontroller μC in FIG. 4). A low level of the input signal $S_{IN}$ causes a reset of the SR-latch 33, which receives the inverted input signal (generated by inverter 34) at its reset input.

The filter 32 may be implemented in various ways. In the example of FIG. 5A, the filter 32 includes a counter 321 which has an enable input EN receiving the output signal of AND-gate 31. Accordingly, the counter 321 is started when the logic conjunction UV & LIM indicates that both conditions, $i_L \geq i_{LIM}$ and $V_B' \leq V_{UVTH}$, are fulfilled at the same time. When enabled, the counter 321 will increase the counter value CNT in each lock cycle of a clock signal CLK, which is supplied to a clock input of the counter 321. If the counter 321 is still enabled after $CNT_{MAX}$ clock cycles, the counter value CNT will reach the reference value $CNT_{MAX}$. The situation $CNT=CNT_{MAX}$ can be detected by comparator 322, which is configured to compare the counter value CNT and the reference value $CNT_{MAX}$. The output of the comparator 322 provides the output signal of the filter 32 which is supplied to the set input of the SR-latch 33 as explained above. The reference value $CNT_{MAX}$ and the clock frequency $f_{CLK}$ of the clock signal CLK define the filter time $t_{FILT}$, i.e. $t_{FILT}=CNT_{MAX}/f_{CLK}$. It is understood, that the comparator 322 may be a digital comparator, which compares two register values, wherein one register value represents the counter value CNT and the other register value represents the reference value $CNT_{MAX}$.

FIG. 5B, illustrates an alternative implementation of the filter 32 within the circuit shown in FIG. 5A. In the example shown in FIG. 5B, the filter 32 includes an RC-lowpass filter composed of resistor $R_F$ and capacitor $C_F$ and configured to filter the output signal of the AND-gate 31. The output signal of the RC-lowpass filter is supplied to a comparator 333 with hysteresis (Schmitt trigger). The comparator thresholds and the time constant ($\tau_F=R_F \cdot C_F$) of the RC-lowpass filter are designed such that the output of the comparator 333 changes from a low level to a high level only if the high-level at the output of the AND-gate 31 is maintained for at least the filter time $t_{FILT}$.

Figure 6:
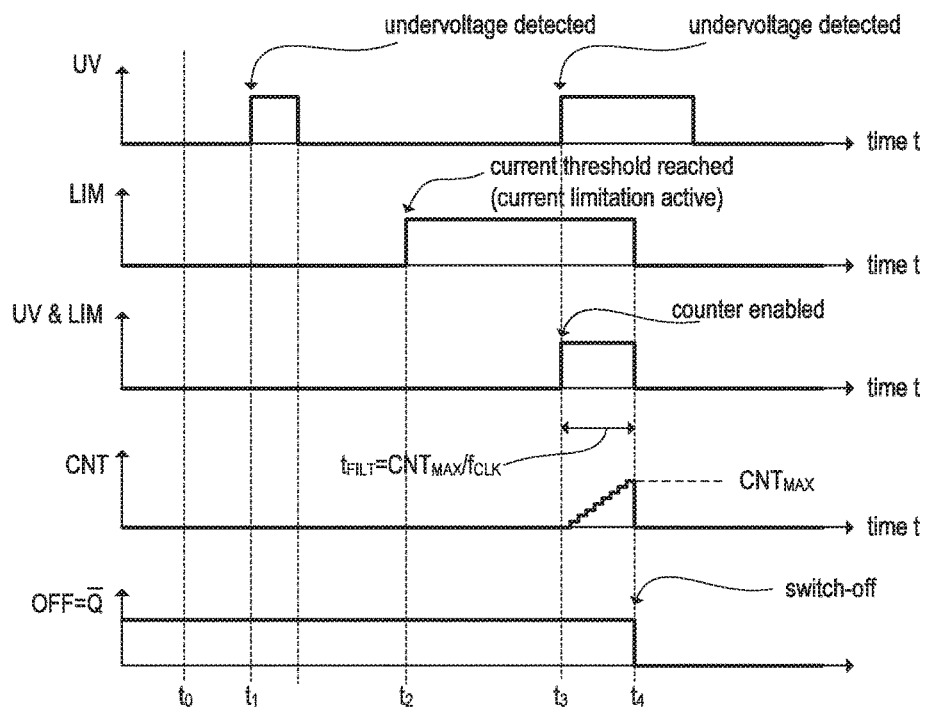
FIGS. 6 and 7 include timing diagrams fur further illustration of the function of the circuit of FIGS. 5A and 5B.
Figure 7:
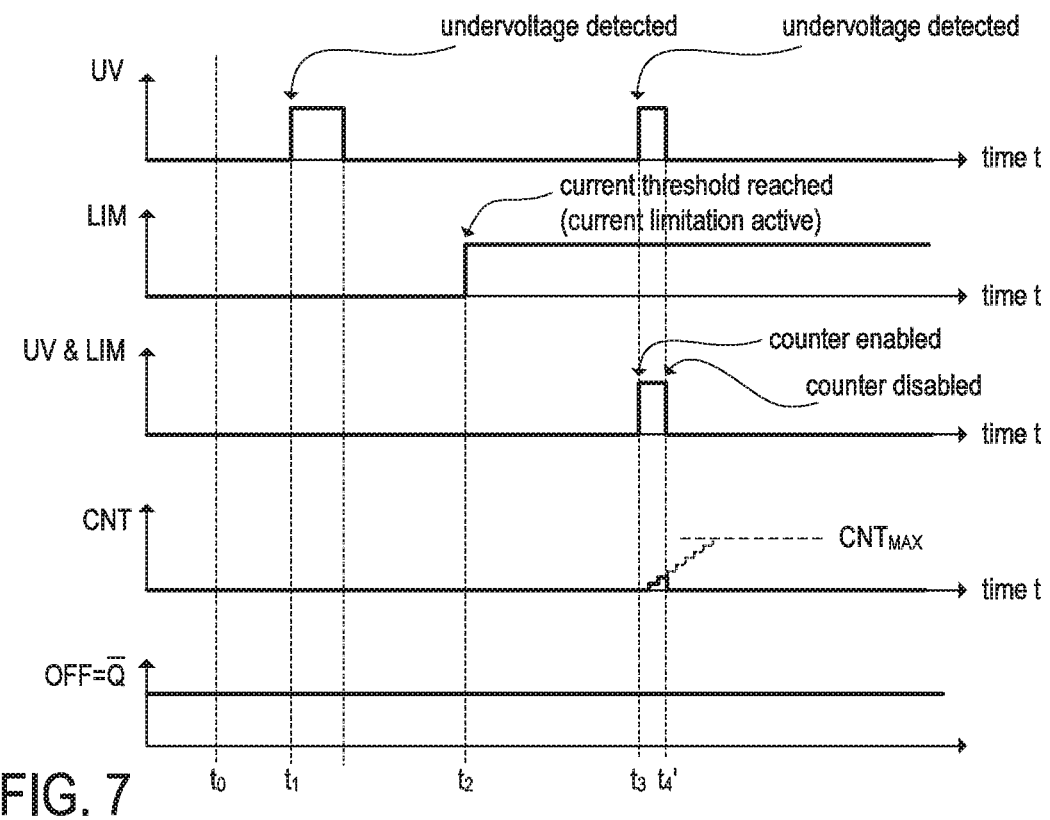

The function of the circuit of FIG. 5A, is further illustrated by the timing diagrams in FIGS. 6 and 7. The timing diagrams of FIG. 6 are consistent with the timing diagrams of FIG. 3. That is, $t_1$ denotes the time instant at which an undervoltage ($V_B' \leq V_{UVTH}$) is detected for the first time, and $t_3$ denotes the time instant at which an undervoltage ($V_B' \leq V_{UVTH}$) is detected for the second time (see FIG. 6, top diagram, and FIG. 3, second diagram). At time instant $t_2$ the load current $i_L$ reaches the current threshold $i_{LIM}$ ($i_L \geq i_{LIM}$), which is indicated by the signal LIM (see FIG. 6, second diagram, and FIG. 3, bottom diagram). Furthermore, the current limitation becomes active at time instant $t_2$. The third diagram of FIG. 6 illustrates the output signal of AND-gate 31 which enables the counter 321 when changing to a high level. If the output signal of AND-gate 31 remains high long enough (i.e. at least for a time $t_{FILT}=CNT_{MAX}/f_{CLK}$) then the counter 321 will count up to $CNT_{MAX}$ (see FIG. 6, fourth diagram). The condition $CNT=CNT_{MAX}$ will be detected by comparator 322 which will then trigger a switch-off of the transistor 2 by setting the SR-latch 33 which, as a consequence, will cause the AND-gate 35 to blank the input signal $S_{IN}$ (see FIG. 6, bottom diagram, inverted output signal OFF of SR-latch 33 causes the blanking of input signal $S_{IN}$).

The timing diagrams of FIG. 7 illustrate a similar situation as FIG. 6. However, different from FIG. 6, the undervoltage condition ($V_B' \leq V_{UVTH}$) detected at time instant $t_3$ lasts only for a short time (shorter than the filter time $t_{FILT}$, see FIG. 7, top diagram). The second diagram of FIG. 7 illustrates the signal LIM which indicates that the load current $i_L$ reaches or exceeds the current threshold $i_{LIM}$ at time instant $t_2$ like in the previous example of FIG. 6. The third diagram of FIG. 7 illustrates the output signal of AND-gate 31, which enables the counter 321 at time instant $t_3$. Different from the previous example, the counter 321 is again disabled before the counter value CNT reaches the reference value $CNT_{MAX}$ (see FIG. 7, fourth diagram). As a consequence, the SR latch 33 will not be set, the signal OFF, which is received by AND-gate 35, remains at a high level (see FIG. 7, bottom diagram), and a blanking of the input signal $S_{IN}$ does not take place.

Figure 8:
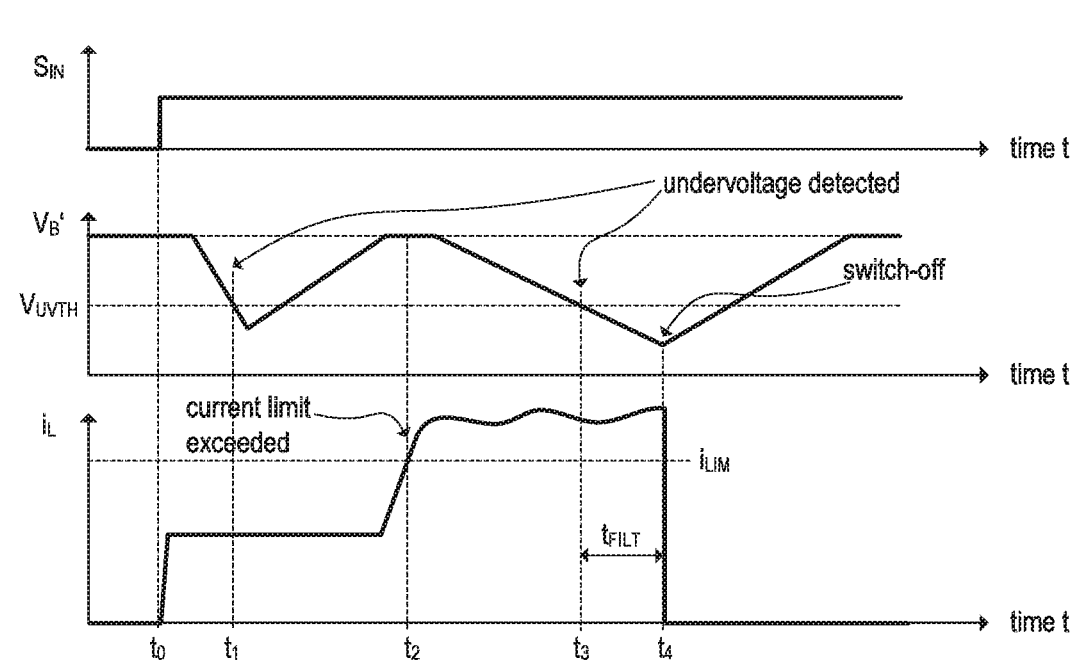
FIG. 8 includes timing diagrams which illustrate the function of an alternative smart switch embodiment, which is basically the same as the smart switch of FIG. 4 but without current limitation function.

FIG. 8 includes timing diagrams which illustrate the function of an alternative smart switch embodiment, which is basically the same as the smart switch of FIG. 4 but without current limitation function. Accordingly, the gate driver 5 (cf. FIG. 4) does not perform a current limitation, when the load current $i_L$ reaches the current threshold $i_{LIM}$, which is equivalent to the current sense signal CS reaching the threshold $CS_{LIM}$. Nevertheless, the current sense signal CS is monitored and the comparator 7 will detect when the current sense signal CS reaches or exceeds the threshold $CS_{LIM}$. The omission of the current limitation function does not require any changes in the control logic illustrated in FIGS. 5A and 5B. Accordingly, the first and the second timing diagrams of FIG. 8 are basically the same as the first and the second diagrams of FIG. 3, the third timing diagram of FIG. 8 is very similar to the third timing diagram of FIG. 3. However, no current limitation is started at time instant $t_2$ and the load current can exceed the threshold $i_{LIM}$. As an option (and as an alternative to the current limitation) an over-current shut-down function may be implemented in one embodiment of the smart switch 1. That is, a switch-off of the transistor 2 is triggered (irrespective of the state of the signal UV) when the load current $i_L$ reaches a maximum allowable current $i_{MAX}$ which is higher than the current threshold $i_{LIM}$.

Figure 9:
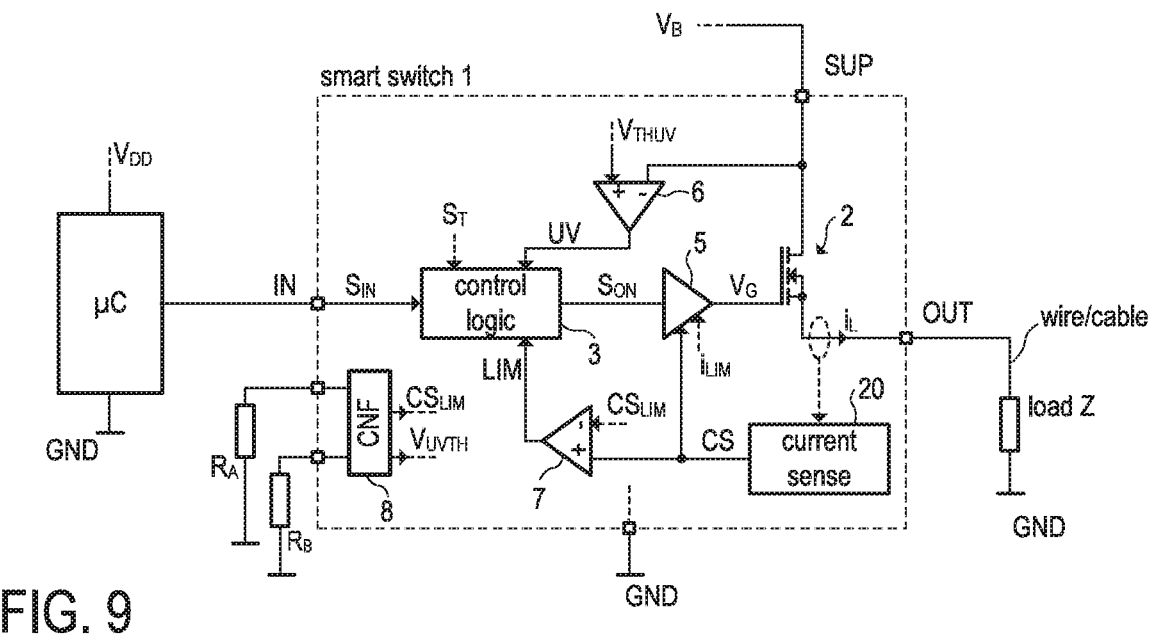
FIGS. 9 to 11 illustrate further embodiments of a smart switch.
Figure 10:
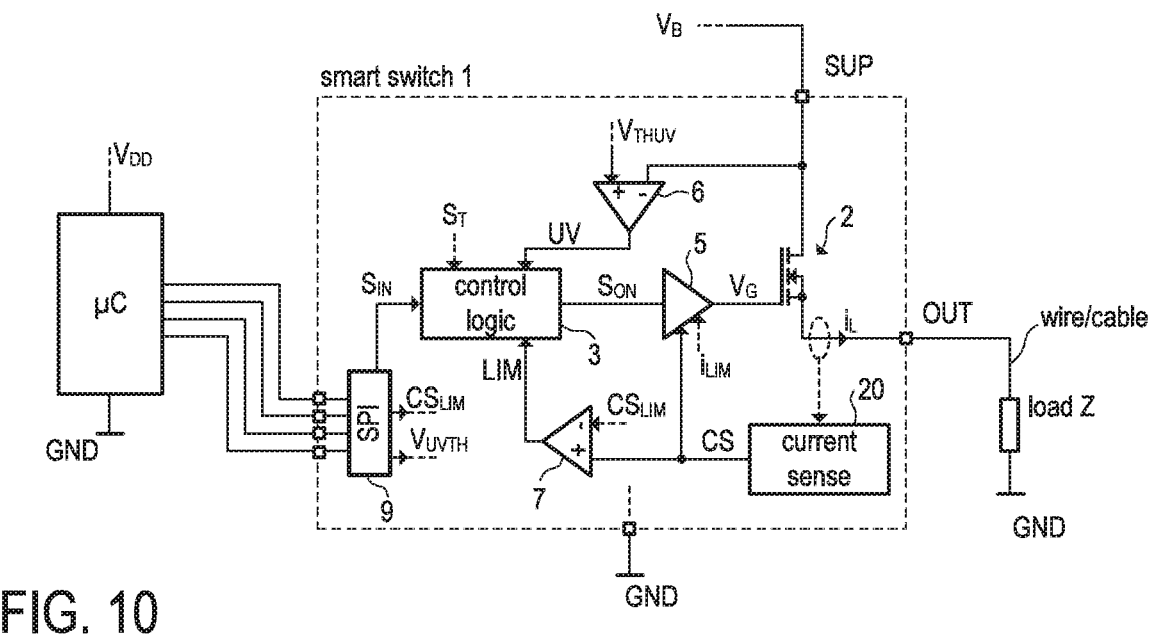
Figure 11:
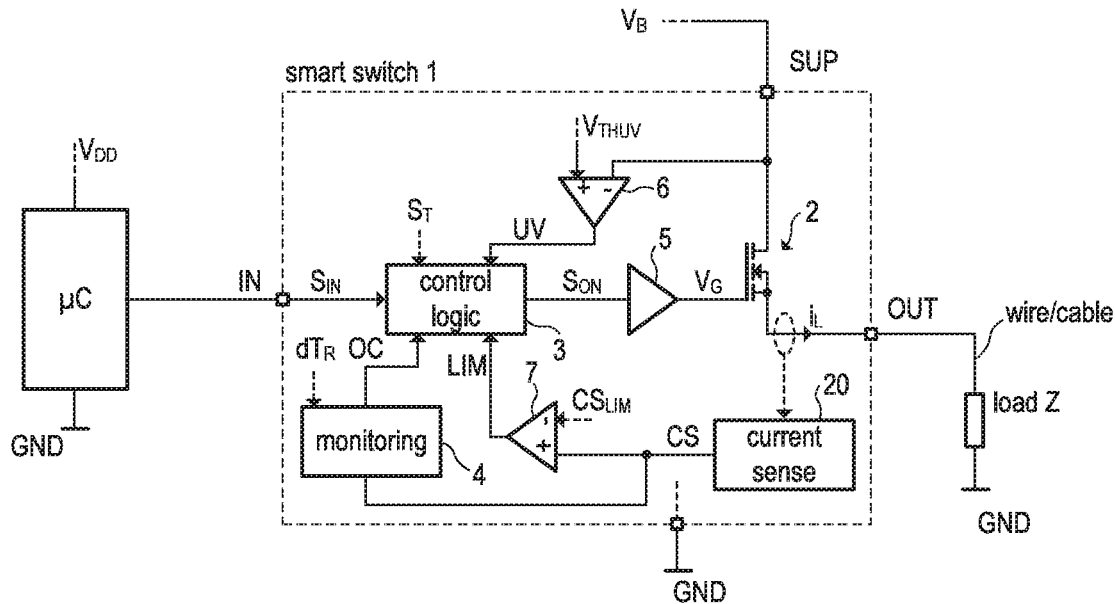

FIGS. 9 to 11 illustrate further embodiments of a smart switch. These embodiments are modifications/enhancements of the embodiment of FIG. 3 and, to avoid reiterations, the following discussion is focused on the differences as compared to FIG. 3.

Various parameters used by the control logic 3 and other components integrated in the smart switch may be configurable. In accordance with the example of FIG. 9, the threshold voltage $V_{UVTH}$ and the current limit $i_{LIM}$ (as represented by $CS_{LIM}$) may be configured using resistors $R_A$ and $R_B$ connected to dedicated configuration pins of the smart switch. In the present example the threshold voltage $V_{UVTH}$ is set dependent on (e.g. proportional to) the resistance of resistor $R_A$ and the current limit $i_{LIM}$ is set dependent on (e.g. proportional to) the resistance of resistor $R_B$. For this purpose, the smart switch may include a configuration circuit 8 that is configured to generate signals representing the current limit $i_{LIM}$ and the threshold voltage $V_{UVTH}$ based on the resistances of resistors $R_A$ and $R_B$, respectively. The concept of configuring parameters, which are processed in an integrated circuit, using external resistors is as such known (see, e.g. US20180287365A1) and therefore nor described in detail herein. For example, the configuration circuit 8 may include current sources configured to output a constant current to the external resistors $R_A$ and $R_B$. In this case the voltages at the configuration pins (to which the resistors are connected) are indicative of the respective parameters. These voltages can be further processed by the configuration circuit 8 and output to, e.g., the comparators 6 and 7. Alternatively, the configuration circuit 8 may include a voltage regulation configured to regulate the voltage across the external resistors $R_A$ and $R_B$ to a constant value. In this case the currents output at the configuration pins (to which the resistors are connected) are indicative to the respective parameters. It is within the scope of a skilled person's knowledge to design the configuration circuit 8 such that it is able to provide the received information in the form that is required to process the information in the circuitry of the smart switch 1 and particularly in the control logic 3 and the comparators 6 and 7.

In the example of FIG. 10, the smart switch includes a communication interface such as a Serial Peripheral Interface (SPI) which allows to communication, e.g. via a serial bus, with an external device such as the microcontroller μC. In this example, various data may be received via the communication interface 9 (e.g. from a microcontroller) including the switch-on and switch-off commands, which have been mentioned earlier. Accordingly, the communication interface may be configured to generate the input signal $S_{IN}$ and to set the logic level of the input signal $S_{IN}$ in accordance with the switch-on and switch-off commands received via the digital communication interface. Moreover, the received data may include information concerning configurable parameters such as, for example, the current limit $i_{LIM}$, the voltage threshold $V_{UVTH}$ and also the filter time $t_{FILT}$ (e.g. represented by the reference value $CNT_{MAX}$). It is within the scope of a skilled person's knowledge to design the communication interface 9 such that it is able to provide the received information in the form that is required to process the information in the circuitry of the smart switch 1 and particularly in the control logic 3 and the comparators 6 and 7.

In the example of FIG. 11, the smart switch includes a monitor circuit 4 that is configured to monitor the current sense signal CS and to determine, based on the current sense signal, when to trigger a switch-off of the transistor 2. For this purpose, the monitor circuit 4 may be configured to "imitate" the characteristic of a fuse, which is blown when it becomes too hot. Smart switches which include circuitry that cause the smart switch to disconnect a load (connected to the output pin OUT) from the supply pin SUP based on a predetermined fuse characteristic are as such known (see, e.g. US20180287365A1) and thus not further explained here. For example, the monitor circuit 4 may be configured to estimate, based on the current sense signal CS, a temperature value, which represents the temperature (relative to ambient temperature) of a wire connecting the output pin OUT and the load Z, and to generate a protection signal OC indicative of whether the estimated temperature value is above a predetermined temperature threshold value or not. If the protection signal indicated an over-temperature, the control circuit 3 may trigger a switch-off of the power transistor 2 in response to the protection signal OC indicating that the estimated temperature value is above a predetermined temperature threshold value. In such an embodiment the protection signal OC may be processed in a similar manner as the output signal of filter 32 in the example of FIG. 5A or 5B. That is, an SR-latch may be set dependent on the level of the protection signal OC and the input signal $S_{IN}$ may be blanked or not dependent on the state of the SR-latch.

Figure 12:
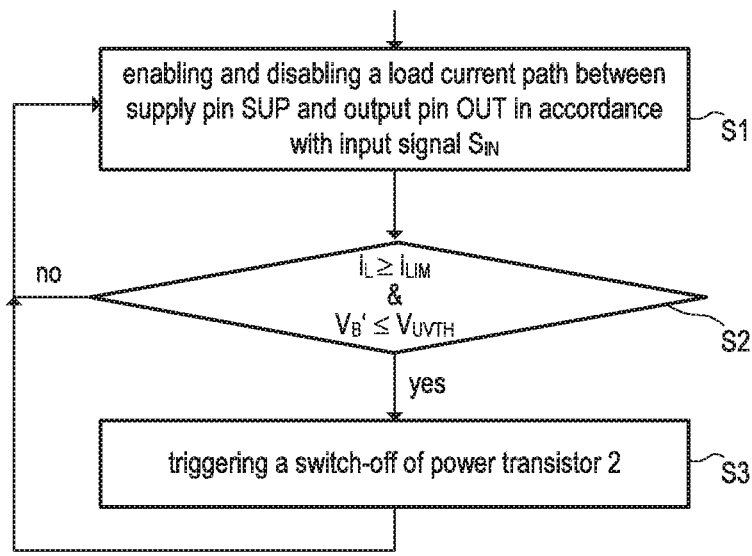
FIG. 12 is a flow chart illustrating one embodiment of a method for operating a smart switch.

FIG. 12 is a flow chart illustrating one embodiment of a method for operating a smart switch. Basically, the flow chart represents the function of a smart switch as described above with reference to FIGS. 1 to 11. Accordingly, the method includes enabling and disabling a load current path between a supply pin SUP and an output pin OUT of smart switch 1 using a power transistor 2 included in the smart switch 1 (see FIG. 12, step S1). The power transistor 2 is switched on and off dependent on an input signal $S_{IN}$, which may, in some embodiments, be received at an input pin of the smart switch 1. The method further includes detecting a situation in which the load current $i_L$ passing through the load current path is at or above a predetermined current $i_{LIM}$ (current limit) and a supply voltage $V_B'$ received at the supply pin SUP is at or below a predetermined threshold voltage $V_{UVTH}$ (see FIG. 12, step S2). A switch-off of transistor 2 is triggered upon detection that the load current $i_L$ passing through the load current path is at or above the predetermined current $i_{LIM}$ and the supply voltage $V_B'$ is at or below the predetermined threshold voltage $V_{UVTH}$.

[45] In some embodiments the switch-off of transistor 2 is triggered when the detected situation (that load current $i_L$ is at or above the predetermined current $i_{LIM}$ and the supply voltage $V_B'$ is below the predetermined threshold voltage $V_{UVTH}$) lasts for at least a predetermined time period $t_{FILT}$.

Although the invention has been illustrated and described with respect to one or more implementations, alterations and/or modifications may be made to the illustrated examples without departing from the spirit and scope of the appended claims. For example, the logic levels used to trigger a specific action may be inverted as compared to the depicted examples. Logic gates may be replaced by other logic circuits that perform substantially the same function, etc. In particular regard to the various functions performed by the above described components or structures (units, assemblies, devices, circuits, systems, etc.), the terms used to describe such components are intended to correspond—unless otherwise indicated—to any component or structure, which performs the specified function of the described component (e.g., that is functionally equivalent), even though not structurally equivalent to the disclosed structure, which performs the function in the herein illustrated exemplary implementations of the invention.

The invention claimed is:

1. An integrated circuit comprising:
   a power transistor coupled between a supply pin and an output pin;
   a control circuit configured to trigger a switch-on and a switch-off of the power transistor in accordance with an input signal;
   a first comparator configured to detect that a supply voltage received at the supply in has fallen to or below a predetermined threshold voltage;
   a second comparator configured to detect that a load current passing through the power transistor is at or above a predetermined current and
   a filter circuit receiving a logic signal indicative of an AND conjunction of an output signal of the first comparator and an output signal of the second comparator;
   wherein the control circuit is configured to trigger a switch-off of the power transistor when the load current passing through the power transistor is at or above the predetermined current and the supply voltage received at the supply pin is at or below the predetermined threshold voltage, and
   wherein a logic circuit is configured to trigger the switch-off of the power transistor based on an output signal of the filter circuit.

2. The integrated circuit of claim 1, further comprising:
   a current sensing circuit configured provide current sense signal representing the load current passing through the power transistor.

3. The integrated circuit of claim 2, further comprising:
a current limiting circuit coupled to the power transistor and the current sensing circuit and configured to limit the load current to a maximum current, the maximum current being the predetermined current.

4. The integrated circuit of claim 1, further comprising:
an under-voltage detection circuit coupled to the supply pin and configured to detect when the supply voltage received at the supply pin drops to or below the predetermined threshold voltage.

5. The integrated circuit of claim 1,
wherein the filter is configured to suppress pulses in the logic signal that are shorter than a filter time.

6. The integrated circuit of claim 1,
wherein the filter includes a counter or a lowpass filter.

7. The integrated circuit of claim 1, the integrated circuit further including:
a digital communication interface configured to receive, via a digital communication link, digital values representing one or more of the following: the predetermined current, the predetermined threshold voltage, or a filter time.

8. The integrated circuit of clam 1, the integrated circuit further including:
a first configuration pin and a second configuration pin configured to receive a first and a second configuration signal that represent the predetermined current and the predetermined threshold voltage, respectively.

9. The integrated circuit of claim 1, further comprising:
a monitoring circuit that is configured to determine a temperature value, which is indicative of a temperature of a wire connected to the output pin and which is estimated based on the load current and a current versus time characteristic associated with the wire,
wherein the monitor circuit is further configured to provide a protection signal indicative of whether the estimated temperature value is above a predetermined temperature threshold value, and
wherein the control circuit is configured to trigger a switch-off of the power transistor in response to the protection signal indicating that the estimated temperature value is above a predetermined temperature threshold value.

10. The integrated circuit of claim 1,
wherein the control circuit is configured to trigger the switch-off of the power transistor when the load current passing through the power transistor is at or above the predetermined current and the supply voltage received at the supply pin is at or below the predetermined threshold voltage for at least a predetermined time period.

11. A method comprising:
enabling and disabling a load current path between a supply pin and an output pin using a power transistor in accordance with an input signal;
detecting that a supply voltage received at the supply pin drops to or below a predetermined threshold voltage using a first comparator;
detecting that a load current passing through the power transistor is at or above a predetermined current using a second comparator;
filtering a logic signal indicative of an AND conjunction of an output signal of the first comparator and an output signal of the second comparator; and
triggering a switch-off of the power transistor when the load current passing through the power transistor is at or above the predetermined current and the supply voltage received at the supply pin is below the predetermined threshold voltage, wherein the triggering of the switch-off of the power transistor is based on the filtered logic signal.

12. The method of claim 11,
wherein the switch-off of the power transistor is triggered when the load current is at or above the predetermined current and the supply voltage received at the supply pin is below the predetermined threshold voltage for at least a predetermined time period.

13. The method of claim 11, further comprising:
generating a current sense signal representing the load current passing through the power transistor.

14. The method of claim 13, further comprising:
limiting the load current to a maximum current using the current sense signal, the maximum current being the predetermined current.

15. The method of claim 11, further comprising:
detecting that the supply voltage received at the supply pin drops to or below the predetermined threshold voltage.

16. The method of claim 11,
wherein the filtering a logic signal is accomplished using a filter circuit that includes a counter or a lowpass filter.

17. The method of claim 11, further comprising:
receiving, via a digital communication link, digital values representing one or more of the following: the predetermined current, the predetermined threshold voltage, or a filter time.

18. The method of claim 11, further comprising:
receiving, at a first configuration pin and a second configuration pin, a first and a second configuration signal that represent the predetermined current and the predetermined threshold voltage, respectively.

19. The method of claim 11, further comprising:
determining a temperature value, which is indicative of a temperature of a wire connected to the output pin and which is estimated based load current and a current versus time characteristic associated with the wire;
generating a protection signal indicative of whether the estimated temperature value is above a predetermined temperature threshold value; and
triggering a switch-off of the power transistor in response to the protection signal indicating that the estimated temperature value is above a predetermined temperature threshold value.

* * * * *

UNITED STATES PATENT AND TRADEMARK OFFICE
CERTIFICATE OF CORRECTION

Page 1 of 1

PATENT NO.         : 11,431,162 B2
APPLICATION NO.    : 16/991930
DATED              : August 30, 2022
INVENTOR(S)        : Christian Djelassi-Tscheck et al.

It is certified that error appears in the above-identified patent and that said Letters Patent is hereby corrected as shown below:

In the Claims

Column 10, Claim 1, Line 46: "...the supply in has fallen..." should be "...the supply pin has fallen..."

Column 10, Claim 1, Line 50: "...predetermined current and..." should be "...predetermined current; and..."

Signed and Sealed this
Fourth Day of July, 2023

Katherine Kelly Vidal
*Director of the United States Patent and Trademark Office*